Sept. 21, 1965 D. M. TURNBULL ETAL 3,206,902
WALL CONSTRUCTION FOR REFRIGERATED VEHICLES
Filed April 8, 1963 3 Sheets-Sheet 1
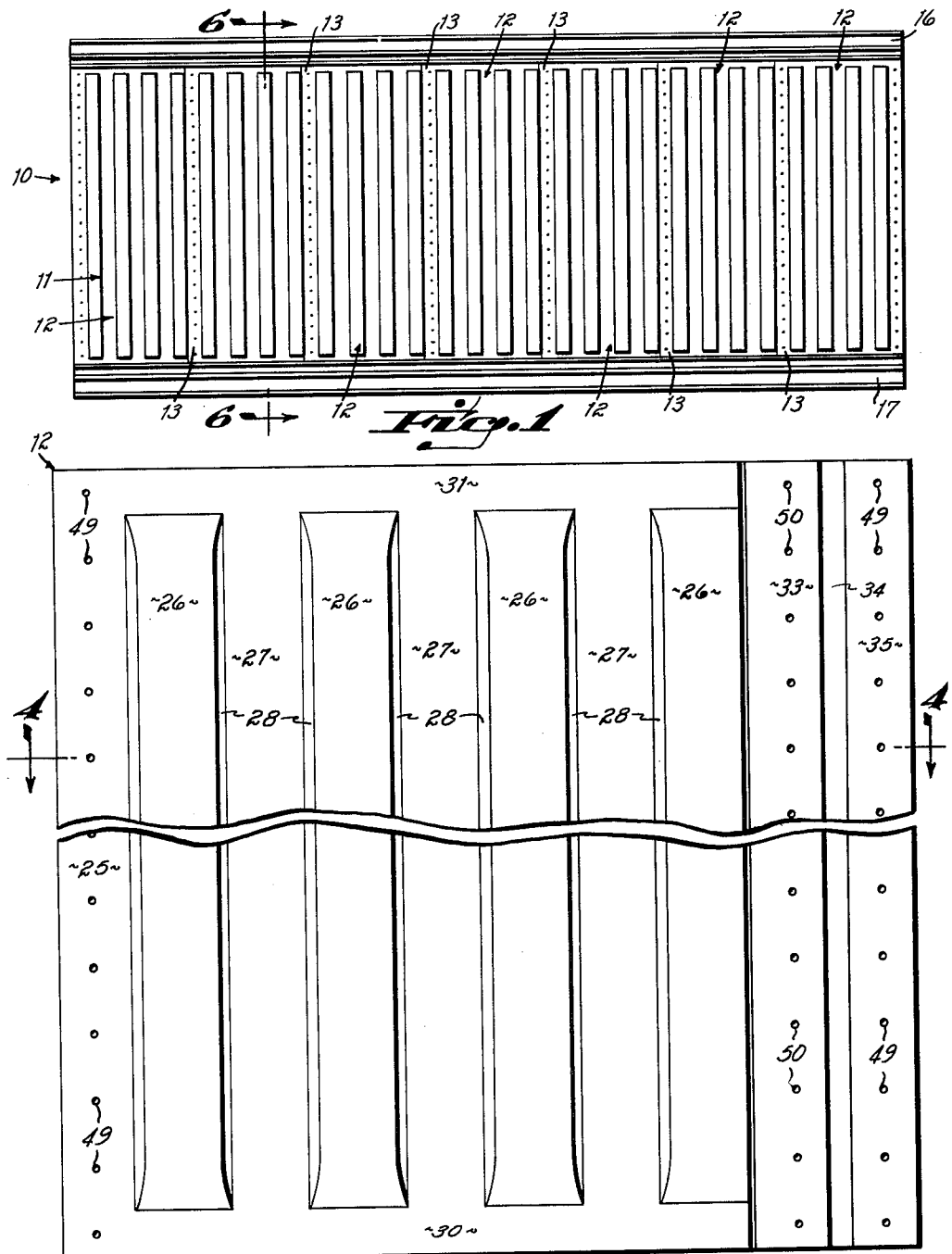
INVENTORS
Donald M. Turnbull
BY William A. Bertolini
Wood, Herron and Evans
ATTORNEYS

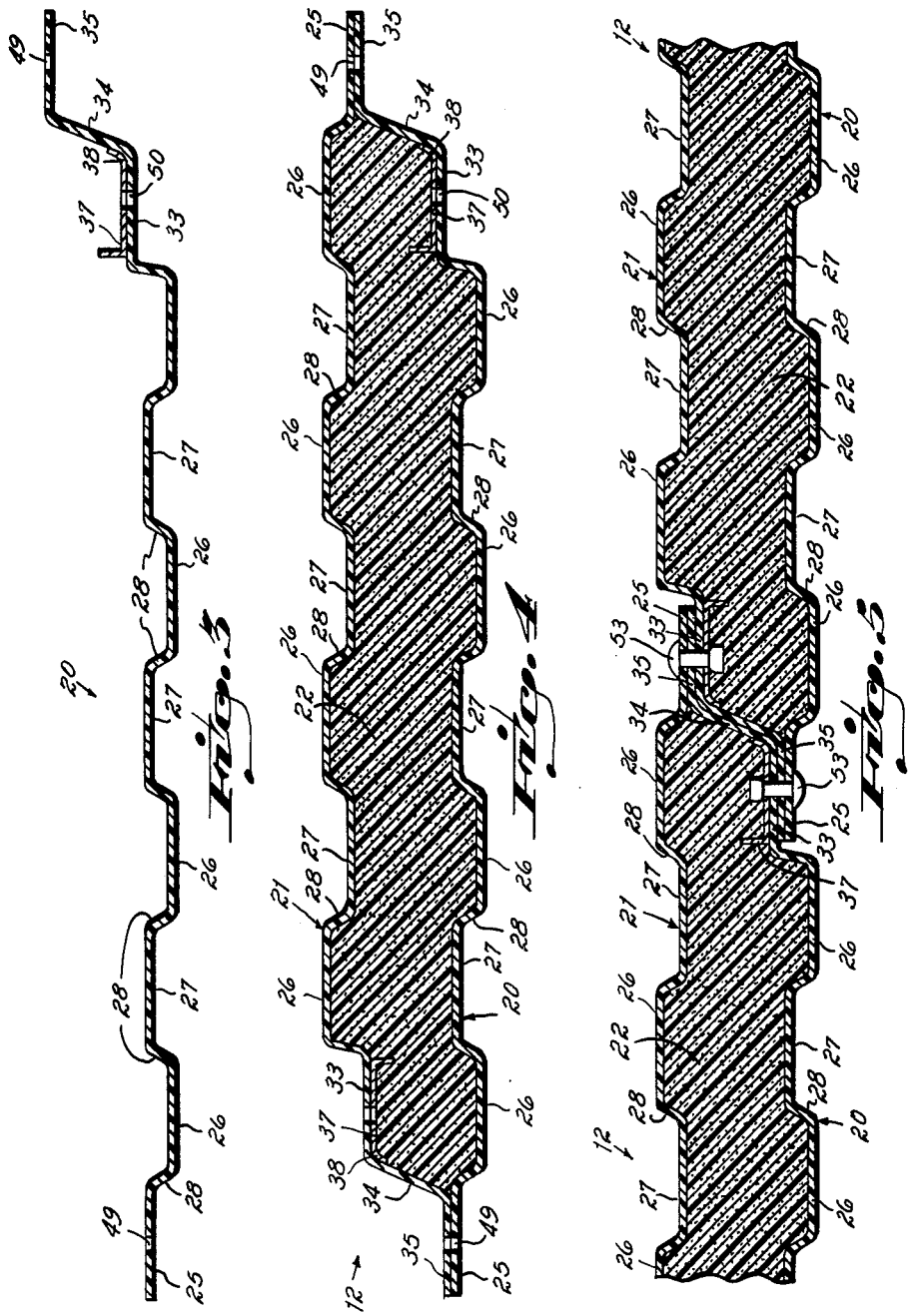

Sept. 21, 1965 D. M. TURNBULL ETAL 3,206,902
WALL CONSTRUCTION FOR REFRIGERATED VEHICLES
Filed April 8, 1963 3 Sheets-Sheet 3

INVENTORS.
Donald M. Turnbull
BY William A. Bertolini
Wood, Herron and Evans
ATTORNEYS

United States Patent Office

3,206,902
Patented Sept. 21, 1965

3,206,902
WALL CONSTRUCTION FOR REFRIGERATED VEHICLES
Donald M. Turnbull and William A. Bertolini, Cincinnati, Ohio, assignors to Pullman Incorporated, Chicago, Ill., a corporation of Delaware
Filed Apr. 8, 1963, Ser. No. 271,066
3 Claims. (Cl. 52—585)

This invention relates to an improved low thermal conductivity wall construction. More specifically, the invention relates to a high strength-to-weight wall assembled from a plurality of modular panels which is especially suitable for use in refrigerated transportable van size containers.

The wall of a refrigerated vehicle such as a semi-trailer imposes rather severe design limitations. The wall must, of course, be sufficiently low in thermal conductivity to establish minimal heat transfer to the interior of the vehicle. At the same time, however, it must be sufficiently strong to withstand several different mechanical forces, each of which may be large in magnitude, including forces transferred to the walls from the frame of the vehicle in transit, forces applied to the inside of the walls by the cargo, and compression loading which may result from a meat rail connected transversely or longitudinally from wall to wall and carrying a heavy pendant load. Moreover, these objectives must be attained with the least possible wall thickness, since the greater the thickness of the wall the smaller the internal cargo space will be. In addition, the wall construction should be as light as possible, because the weight of the wall comprises a large portion of the total permissible weight limit of the vehicle.

At the present time wall constructions for refrigerated trailer vehicles usually, though not always, consist of a series of vertical wooden or metal posts, which may be I-shaped in section, fastened at spaced intervals to the vehicle frame or chassis. An outer skin sheet, typically of aluminum, is secured over the outside of these posts, and an inner skin sheet, which may be plywood, is secured to the inner side of the posts. The space between the sheets is filled with an insulating material. Such a construction is relatively easy to fabricate, but is not as light as might be desired, and its insulating characteristics are not especially good in relation to its weight.

It has been an objective of this invention to provide a new type of wall construction for refrigerated vehicles which will be better than present constructions in respect to thermal conductivity, weight, and mechanical strength, yet which will be no more difficult to fabricate than present constructions.

In accordance with this invention, an insulative wall is assembled from a plurality of modular panels, each of which may be identical to the others. Each panel has specially formed corrugations on its inner and outer surfaces, and has a unique marginal edge structure such that the panels can easily be connected together to provide a strong integral wall which at the same time presents no high-conductivity posts extending between the inner and outer surfaces of the wall.

The panels of this invention are especially adapted to be made of glass fibre reinforced inner and outer skin sheets, and to have a foamed plastic core between the skin sheets.

Tests have demonstrated that the panels described herein possess excellent insulating characteristics, are very light in weight relative to other constructions of similar strength and area, and have more than adequate excellent mechanical strength enabling them to withstand the forces encountered in transit.

While we have described these panels hereinafter primarily in relation to the fabrication of walls for a refrigerated trailer vehicle, it may be mentioned that these panels can also be used in the fabrication of other transportable van size containers, for example, wheel-less containers adapted to be carried on a railroad car, in the hold of a ship, or on a flat bed trailer, as well as for the fabrication of non-transportable rooms or freezer compartments.

The concepts on which this invention is based can best be further described in relation to the accompanying drawings, in which:

FIGURE 1 is an elevation of the side of the body of a refrigerated trailer vehicle having side panels formed in accordance with this invention;

FIGURE 2 is an enlarged view, partly broken away, of a single panel in accordance with the invention;

FIGURE 3 is a transverse section through the fibre reinforced plastic skin sheet of a panel;

FIGURE 4 is a transverse section through an assembled panel, taken on line 4—4 of FIGURE 2;

FIGURE 5 is a transverse section through the adjacent portions of a pair of panels, illustrating the manner in which they are joined at their edges.

Figure 6:
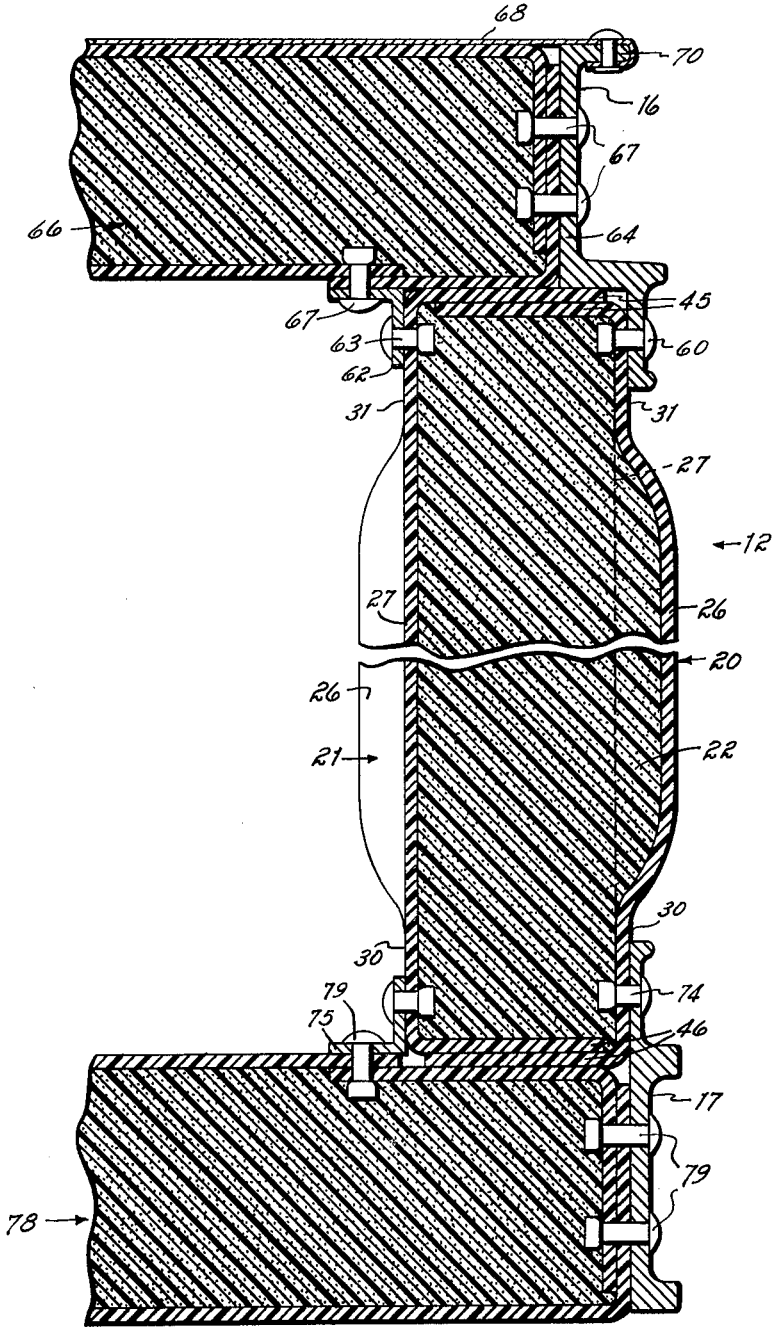
FIGURE 6 is a vertical section, partly broken away, through a refrigerated vehicle wall assembly, taken on line 6—6 of FIGURE 1.

In FIGURE 1, the body of a refrigerated trailer vehicle or transportable van-size container is designated generally by the numeral 10 and includes a vertical side wall 11 which is assembled from a series of panels 12 formed in accordance with the principles of this invention. In this figure, seven panels 12 are shown joined together to form the side wall 11; different numbers of panels may be assembled to provide bodies of different lengths.

The panels 12 are joined along their respective vertical margins as indicated at 13. Along their upper marginal portions the panels 12 are secured to a longitudinally extending quarter panel or beam 16, of which a suitable configuration is shown in FIGURE 6, and which is joined to the top of the container or vehicle.

The lower marginal portions of the panels 12 are joined to a rub rail 17, of which a suitable configuration is shown in section in FIGURE 6. This rub rail 17 is joined to the bottom or floor of the body.

Broadly speaking, as best shown in FIGURE 4, each panel 12 comprises an outer skin sheet 20, an inner skin sheet 21 which is identical in size and shape to the outer sheet 20 but which is reversed in orientation relative to the outer skin sheet 20, and a foamed insulative plastic core 22 between the skin sheets 20 and 21. Since both sheets 20 and 21 are identical, it will suffice to describe the sheet 20.

Along one vertical margin the sheet 20 has a flat portion 25. A series of vertical corrugations, each designated by 26, are formed at spaced regular intervals across the width of the sheet, the surfaces of these corrugations 26 preferably being co-planar. The corrugations 26 are separated by relatively recessed portions 27 which preferably are co-planar with the edge portion 25. Angulated web portions 28 extend between the outer corrugation 26 and the edge portion 25 and also between each corrugation and the adjacent intermediate or recessed portion 27.

As best shown in FIGURE 6, the corrugations 26 preferably do not extend the full height of the panel 12, but rather are returned to the general plane of the edge portion 25 and the intermediate portions 27, as at 30, adjacent the lower edge of the panel, and as at 31, adjacent the top edge of the panel.

Adjacent the vertical edge which is opposite to the marginal portion 25 the panel is configured with a flat abutment surface 33, a diagonally extending or angulated web 34, and a marginal portion 35. The plane of the abutment surface 33 is offset slightly with respect to the plane of the portions 25 and 27, in the direction opposite to that in which the corrugations 26 are offset, the amount of this offset preferably being about twice the thickness of the sheet. The edge portion 35 is still further offset to define the thickness of the internal cavity of the panel.

The skin sheets 20 and 21 are preferably made of a glass fibre reinforced polyester resin. They may suitably be about 0.070 inch in thickness, and can be formed in a die. Because the panels 20 and 21 are identical, a single die may be used for the manufacture of both, which are then reversed and assembled, as will be explained.

A steel backing strip or channel 37 resides against the face of abutment surface 33 which is opposite to the corrugations 26. This strip 37 has a vertical edge which may be seated in the angle 38 between the abutment surface 33 and web 34. Strip 37 is suitably formed in 18 gauge steel, and provides reinforcement for fasteners which project through the skin sheets and which connect the panels to each other. The strip 37 can either be molded in place when the individual sheet is formed, or can be secured in place adhesively after the sheet has been formed, prior to introduction of the core 22. Preferably strip 37 is channel shaped as shown although it may be of other form, e.g. an angle.

As shown in FIGURE 6, the top marginal portion of skin sheet 20 is bent perpendicularly to the general plane of the sheet, in the direction opposite the corrugations 26, to form a top flange 45. Similarly, at the bottom of the sheet there is formed a lower flange 46, extending parallel to the top flange 45.

The manner in which the two sheets 20 and 21 are united to form an integral panel is illustrated in FIGURES 4, 5 and 6. Sheet 21 is rotated 180 degrees with respect to the skin sheet 20, and is placed so that the marginal portion 25 of one sheet resides in facial contact with the other marginal portion 35 of the second sheet. With the sheets so arranged, it will be seen that the corrugations 26 of one sheet are generally opposite to the intermediate portions 27 of the other panel. A series of holes 49 are formed at spaced vertical intervals through the abutting marginal portions 25 and 35 on each vertical margin of the panel. Holes 50 at spaced vertical intervals are formed through the abutment surface 33 and the back up strip 37 adjacent thereto.

In assembly, sheets 20 and 21 are slightly staggered vertically so that the top and bottom flanges 45, 45 and 46, 46 of the respective panels are in facial contact as shown in FIGURE 6. The flanges may be secured together for greater strength, although this not generally necessary.

With the skin sheets 21 and 22 disposed in the relation shown in FIGURES 4 and 6, a foaming plastic resin such as polyurethane is introduced into the cavity or chamber between the sheets, and is caused to foam and fill the cavity, thereby providing a highly insulative core 22. The catalysed resin may be introduced through openings in the flanges 45 and/or 46. The panels are confined by a jig sufficiently strong to resist the pressure incidental to foaming.

One advantage in the use of a foaming resin for this purpose is that by appropriate choice of materials the foamed core will adhere strongly to the skin sheets, thereby holding them rigidly so that a very strong sandwich-type panel is formed. Alternatively, however, the skins may be secured adhesively or by conventional fasteners and the space between them filled with a conventional particulate or fibrous insulating material.

The manner in which two panels 12 of the type described are interconnected is illustrated in FIGURE 5. One panel, i.e. the panel shown at the left in FIGURE 5, is placed so that its right marginal portion 35 is in facial contact with the abutment surface 33 of the other panel, i.e., the panel at the right in FIGURE 5. By reason of the similarity of the panels, the surface 35 of the right panel is then also in facial engagement with the abutment surface 33 of the left panel, and the two webs 34 are surface to surface. Fastening means such as blind rivets 53 are inserted into the aligned holes 49 and 50 to interconnect the panels. It will be seen that these rivets 53 extended through the back up strips 37, and that the back up strips thereby provided additional rigidity to the connections.

One of the advantages of this construction, as will be apparent from FIGURE 5, is that the panel-to-panel joint so formed has an effective internal post but includes no high thermal conductivity path between the two faces of the panels. That is, the web portions 34, 34 which extend between the opposite sheets 20 and 21 act as structural posts but are poor heat conductors and do not impair the so-called "U factor" of the two interconnected panels as an integral unit.

The corrugations 26 serve two functions: they greatly rigidify the panels against shear buckling, and the corrugations which are on the inside of the container formed from the panels provide spaces for the circulation of air around cargo which is placed close to the walls.

The fabrication of a container from panels of the type described is illustrated in FIGURE 6. A wall assembled from a plurality of panels 12 is secured to a quarter panel 16, suitably of extruded aluminum, by fastening means such as rivets 60 which extend through the flat or uncorrugated top portion 31 of the panels. It is to permit this quarter panel 16 to be placed in continuous flush engagement with the surface of panel 12 that the corrugations 26 do not extend the full height of the panels. An angle 62 is connected to the top edge of the inner skin sheet 21 by suitable fastening means such as rivets 63. In the corner or angle defined by the top flange 45 of the skin sheet 21 and the upstanding leg 64 of the quarter panel 16 there is seated and secured a top panel 66 which may be of foamed sandwich construction. Blind rivets 67 fasten the top to the angle 62 and quarter panel 16. A top skin sheet 68 is placed over the top panel 66, and is bent around and secured to a flange 70 formed at the top of quarter panel 16.

The flat lower edge 30 of the outer skin sheet 20 is fastened to rub rail 17 by rivets 74. An angle 75 is secured along the edge of the inner skin sheet 21 by rivets. A bottom panel 78 is fastened between the rub rail 17 and the angle 75, as by rivets 79. Similar to top panel 66, this bottom panel 78 preferably comprises a rectangular foamed sandwich panel having fibre reinforced resin outer sheets and a foamed core.

In the container construction described there are no metal members extending from the outside surface of the container to the interior. It should be noted, however, that the panels may be assembled with top and bottom consructions other than those shown in FIGURE 6.

The panels we have invented present several advantages in comparison to previous refrigerated vehicle wall constructions. The panels are stronger by a considerable margin than prior constructions, yet are made from materials which are lower in cost. Moreover, each panel is lighter than an equal area of the present skin, post and liner construction used in trailer vehicles. Its insulating qualities are improved. The use of fibre reinforced plastic skin sheets eliminates corrosion, and colors may be molded into the skin sheets so that no painting is necessary. The surface has great impact resistance, and if damaged is easily patched. At the same time, because of the congruity from panel-to-panel, the advantages of modular construction are utilized.

Having described our invention, we claim:

1. A thermally insulative wall structure comprising at least two modular panels, each panel being constituted by:

an outer skin sheet and a substantially identical inner skin sheet, said sheets engaging each other only along their edges in a manner to be described and defining and internal cavity between them, and a foamed plastic core in said cavity, each said skin sheet comprising, a sheet of substantially unform thickness having a series of parallel ribs formed in it, each pair of said ribs being spaced by a depression between them, the peaks of said ribs being coplanar and the bottoms of said depressions being coplanar, the widths of said ribs and depressions all being substantially equal, a first flat marginal area adjoining a rib along one side of the sheet, the edge of said area defining the edge of said sheet, said area being coplanar with said depressions, an abutment surface spaced from said marginal area by said ribs and depressions, said abutment surface being adjacent to a rib and residing in a plane parallel to but inset from the plane of said depressions and marginal area by about twice the thickness of the sheet, said first flat marginal area being located along the opposite side of said sheet from said abutment surface, a web extending angularly from said abutment surface in the direction away from said ribs, a second flat marginal area along the outer edge of said web, said second area being parallel to but inset from said abutment surface and from said first area, the widths of both said marginal areas being no greater than the width of said abutment surface, the width of said abutment surface being approximately equal to that of said ribs, the width of said web being several times the height of said ribs, a reinforcing member adhered to said abutment surface on the surface thereof opposite from said ribs, said member having a dimension perpendicular to the plane of said sheet which is substantially less than that of said web, said inner skin sheet being reversely oriented with respect to said outer sheet so that the first marginal area of each skin sheet is in facial engagement with the second marginal area of the other sheet, the ribs of each skin sheet being disposed opposite to the depressions of the other sheet, the thickness of said cavity being uniform throughout, said sheets and core being secured facially to form an integral unit, said panels being joined together at their edges with said first marginal portions of each overlying said abutment surfaces of each and said webs overlying and in contact with each other.

2. The panel of claim 1 wherein said skin sheets are made of molded glass fiber reinforced polyester and wherein said core is a foamed polyurethane which is self-adherent to said skin sheets.

3. A thermally insulative wall structure comprising at least two modular panels, each panel being constituted by:

an outer skin and an inner skin, both said skins having vertical corrugations, the outer skin having a flat attachment strip formed integrally along one vertical edge, said outer skin having an abutment strip spaced from said attachment strip by said corrugations, a web extending angularly from the abutment strip toward the inner skin, and a second attachment strip at the edge of the web offset from said abutment strip, said first named attachment strip being located at the opposite edge of said outer skin from said abutment strip, the planes of said first and second attachment strips and said abutment strip being parallel to each other and to the general plane of said skin, said abutment strip being offset from said first attachment strip by about twice the thickness of said skin, said inner skin being substantially identical to said outer skin and having its first attachment strip facially engaged with the second attachment strip of the outer skin, the second attachment strip of said inner skin being facially engaged with the first attachment strip of said outer skin, means attaching the facially engaging strips of said skins to each other, the peaks of the corrugations of the inner and outer skins being alternately arranged so that the dimension from skin to skin is substantially equal at all points other than along the vertical margins thereof, and a foamed insulative core between said skins and adhesively securing said skins in the relation described, said panels being joined at their edges with said first attachment strip of each overlying said abutment strip of each, and said webs overlying and in contact with each other.

References Cited by the Examiner

UNITED STATES PATENTS

| | | | |
|---|---|---|---|
| 1,971,010 | 8/34 | Korn | 52—592 |
| 2,791,463 | 5/57 | Levitt | 52—404 |
| 2,897,557 | 3/59 | Wiegand | 52—578 |
| 2,896,271 | 7/59 | Kloote et al. | 52—63 |
| 2,934,372 | 4/60 | Jewell et al. | 52—282 |
| 3,042,157 | 7/62 | Dorfman | 52—403 |
| 3,110,064 | 11/63 | Koontz | 52—521 |
| 3,110,370 | 11/63 | Wulf et al. | 52—619 |

OTHER REFERENCES

Reynolds Lifetime Aluminum Publication, Industrial Corrugated Roofing and Siding, Reynolds Metals Company, Building Products Division, Louisville, Kentucky, AIA File No. 12–c, received in Patent Office Apr. 14, 1953 (Gr. 420).

RICHARD W. COOKE, JR., *Primary Examiner.*

JACOB L. NACKENOFF, FRANK L. ABBOTT,
*Examiners.*